April 18, 1950     P. M. ARNOLD     2,504,172
DEALKYLATION OF ALKYL PYRIDINES
Filed March 14, 1946
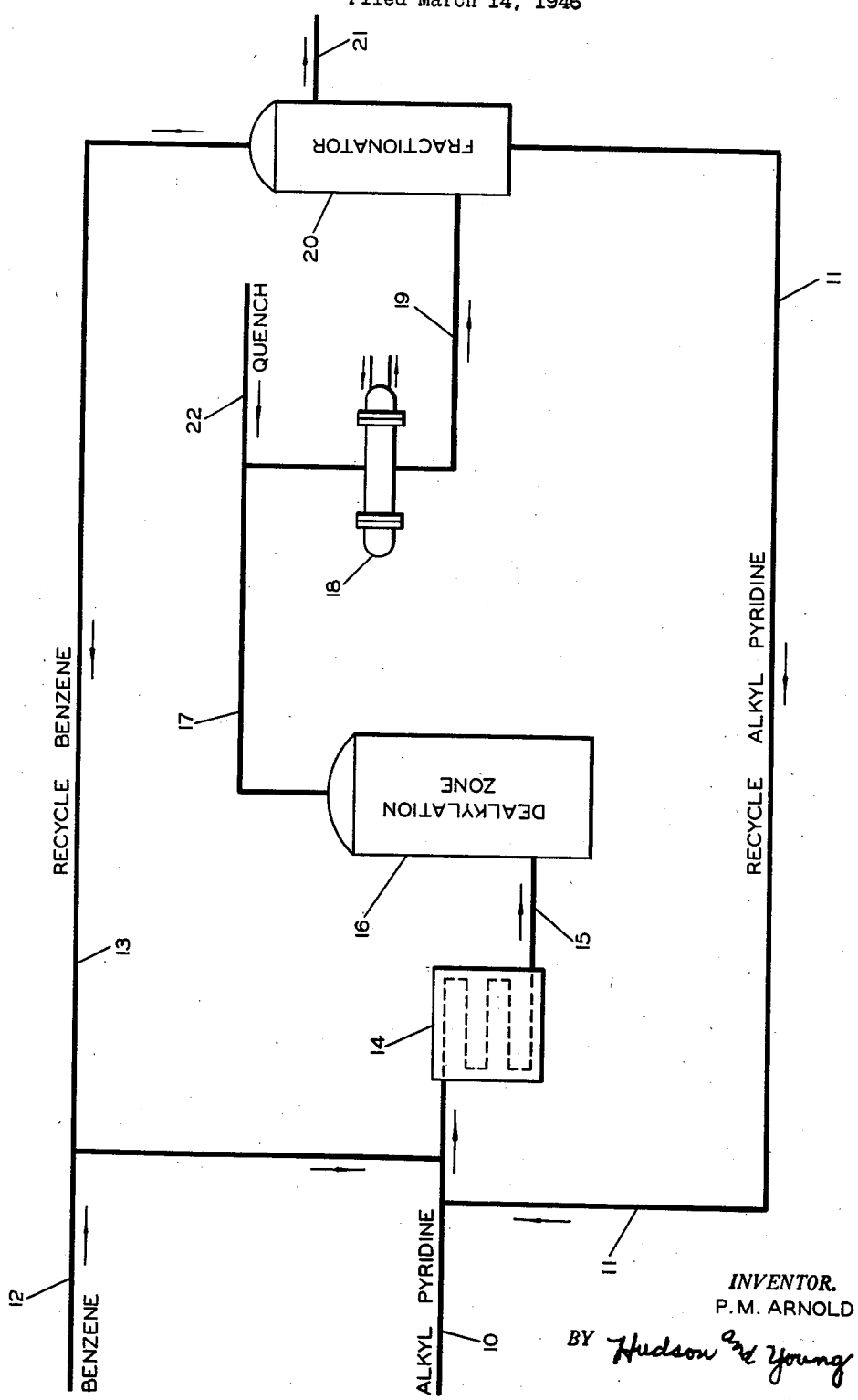
INVENTOR.
P.M. ARNOLD
BY Hudson & Young
ATTORNEYS Patented Apr. 18, 1950

2,504,172

UNITED STATES PATENT OFFICE 2,504,172

DEALKYLATION OF ALKYL PYRIDINES

Philip M. Arnold, Bartlesville, Okla., assignor to Phillips Petroleum Company, a corporation of Delaware Application March 14, 1946, Serial No. 654,455

9 Claims. (Cl. 260—290)

This invention relates to the dealkylation of alkyl cyclic compounds. More particularly, the invention relates to the dealkylation of alkyl pyridines for the preparation of pyridine and alkyl pyridines of lower molecular weight.

Pyridine has of itself many important uses. It is used medicinally for antiseptic purposes and in the treatment of asthma and other diseases, such as some protozoal diseases. It is often used as a denaturant for alcohol and as a catalyst in certain specific chemical reactions, such as the hydration of olefins and sulfonation of alcohols. Pyridine is one of the best organic solvents, readily dissolving a large number of technical products such as fats, mineral oils, paints and rubber and thus is also useful as an extractive agent. It has the remarkable property of dissolving many metallic salts such as silver nitrate and mercuric acetate. Pure pyridine is mainly used for the production of piperidine (hexahydropyridine) which was one of the first organic accelerators used in the vulcanization of rubber and is often used as a catalyst in synthetic organic chemistry. Pyridine and its derivatives are frequently used in the manufacture of dyestuffs and in the dyeing of textiles.

Pyridine is also the beginning material for the production of numerous other valuable compounds. From pyridine various homologs may be formed which are also important in the fields in which pyridine is useful, particularly in the preparation of pharmaceutical products. Similarly, various derivatives of pyridine and of its homologs are produced and used extensively in the chemical industry.

Pyridine and its homologs are formed in the destructive distillation of coal tar, bone oil and nitrogenous vegetable compounds and are present in the acid phase in the ammonium sulfate process. These compounds are also present in gases which are formed when coal is being coked and constitute the major portion of the nitrogenous compounds which may be present in petroleum oils in amounts up to 1 or 2 per cent. Recovery of the picolines, lutidines, collidines, and other homologs of pyridine from the nitrogenous constituents yields mixtures of these compounds in varying proportions. It is frequently desired to recover a larger proportion of pyridine itself or of certain specific homologs.

It is therefore an object of this invention to describe a process for the formation and recovery of pyridine.

It is a further object of this invention to describe a process for the formation of pyridine from its homologs.

Another object is to describe a process for the dealkylation of alkyl pyridines.

A still further object of the invention is to describe a process for the production of alkyl pyridines of relatively lower molecular weight from a mixture of heavier alkyl pyridines.

Another object is to describe a process for the dealkylation of alkyl pyridines in the presence of hydrocarbons forming stable alkylated compounds.

Still another object is to describe a process for the dealkylation of alkyl pyridines in the presence of aromatic hydrocarbons.

An object is to describe a process for the dealkylation of alkyl pyridines in the presence of benzene and the formation of alkyl benzenes.

Other objects will be apparent from the following discussion and the accompanying drawing in which The figure is a diagrammatic sketch of one modification of an arrangement for practicing the present invention.

In general the present invention comprises carrying out the dealkylation of alkyl pyridines in the presence of aromatic compounds to form pyridine and/or alkyl pyridines of lower molecular weight. Clay-type catalyst, such as fuller's earth, pumice and diatomaceous earth, and also bauxite, silica-alumina and similar materials, may be employed advantageously. Temperatures in the range of 850 to 1200° F. and superatmospheric pressures are preferred in the conversion zone. The process may be operated continuously with the recovery and recycle of unreacted alkyl pyridine and the aromatic compounds.

The predominant reaction may be represented by the general equation

in which R may be methyl, ethyl or other alkyl radical; $x$ and $x'$ represent whole numbers between 0 and 5, $y$ represents a whole number; and $z$ represents an integer between 0 and 6. The value of $y$, i. e., the quantity of aromatics, depends somewhat on the nature of the substituted pyridine, such as the number of alkyl groups attached to the pyridine nucleus, and the proportion of aromatic compounds desired to be present according to the following discussion.

The exact reaction is not thoroughly understood but a detailed knowledge of the reaction mechanics is not essential to the practice of the invention. The reaction may involve a direct exchange of a hydrogen of the aromatic reactant compound with an alkyl radical of the alkyl pyridine, or there may be present free alkyl radicals and hydrogen ions with a rearrangement of the constituent parts. Particularly with heavier alkyl radicals there may be a splitting of the radical with the formation of more radicals of fewer carbon atoms. Several of the possible reactions may occur simultaneously under the conditions of the process. Thus ethyl pyridine may be dealkylated in the presence of benzene to form pyridine and ethyl benzene, di-ethyl pyridine may be dealkylated to form pyridine and di-ethyl benzene or ethyl pyridine and ethyl benzene, and other alkyl pyridines may be dealkylated to form various alkyl aromatic compounds and pyridine or simpler alkyl pyridines as more fully discussed below.

The catalysts as described are preferably of the clay type. Fuller's earth, pumice, diatomaceous earth and other clay-type catalysts, both natural and synthetic, as well as bauxite, silica-alumina and similar materials suffer little loss in the process and are easily regenerated when spent. Suitable silica-alumina catalyst may be prepared as described in either McKinney 2,142,324, issued January 3, 1939, or Hendrix et al. 2,342,196, issued February 22, 1944. Under the conditions of the process some cracking occurs and carbon is deposited on the catalyst, thereby reducing its catalytic activity. When the activity has become reduced or the catalyst inactivated, the activity may be restored by burning out the carbon with an oxygen-containing stream at elevated temperature. For greater efficiency the catalyst should be used in the form of particles of such physical form that the catalyst may be effectively disposed in the conversion zone and still permit the ready flow of reactants therethrough and a suitable surface area of catalyst for contact with the reactants. Carrier materials of suitable form and impregnated with active catalytic substances may also be used in the process. Small pellets, rods or cylinders are efficient and convenient forms for the catalytic material.

The invention may be more clearly understood by reference to the accompanying drawing which illustrates one process for the practice of the invention. For convenience, the aromatic compound, acting as the alkyl acceptor, is described as benzene which is most generally used, although other aromatic compounds may be used as described. Alkyl pyridines from line 10 and recycle alkyl pyridines from line 11 are admixed with benzene from line 12 and recycle benzene from line 13 and introduced into heater 14. The heated mixture is passed by line 15 to dealkylation zone 16 and through line 17 to a condenser 18. If desired, the effluent from the dealkylation zone may be quickly cooled by quenching with water or hydrocarbon introduced through line 22. If quenching is employed, subsequent fractionation may be expedited if benzene is used for the quenching material. From condenser 18 the mixture passes through line 19 to fractionator 20 in which the unreacted alkyl pyridines and benzene are separated and recycled to the process through lines 11 and 13, respectively. Pyridine and the alkyl benzene compounds are removed by line 21 to further fractionation or to storage. For clarity of description various valves, pumps, and other standard equipment have been omitted from the drawing and description but will be familiar to those skilled in the art.

From more highly substituted pyridine compounds, the dealkylation may be controlled to prepare desired alkylated pyridine compounds which are less substituted than the original compounds. Thus, collidines may be dealkylated to various lutidines and picolines, lutidines to various picolines, and other pyridines of homogeneous or mixed alkyl substituents may be converted to alkyl pyridines having fewer alkyl groups. Similarly, the aromatic acceptor compounds (e. g., benzene) may accept various numbers of homogeneous and mixed alkyl groups to form desirable alkylated compounds. Undesirable heavy resinous compounds or light decomposition products which may form in small quantities may be removed (by means not shown) before return of the recycle material to the conversion zone.

The use of a large molar excess of the acceptor aromatic compound is advantageous both because of its diluent effect, which favors the dealkylation of the alkyl pyridines by lowering their partial pressure in the reaction zone, and because of its reaction to form valuable alkyl aromatics. The extent of dealkylation may be controlled to a large degree by the ratio of aromatics to alkyl pyridine maintained in the dealkylation zone. The higher the concentration of the acceptor aromatic under suitable reaction conditions, the greater will be the extent of the dealkylation, and a ratio of aromatics to alkyl pyridine between about 1:1 and 10:1 or higher has been found to be satisfactory. The temperature of reaction is also a major factor in the extent of conversion. As above-mentioned, the temperature may be between 850 and 1200° F. Higher temperatures are generally required in the dealkylation of the alkylated pyridines having alkyl groups of fewer carbon atoms such as methyl and ethyl. Alkyl pyridines of higher molecular weight alkyl groups are less resistant to dealkylation and react at lower temperature. For the same charging stock a relatively broad range of temperatures for conversion may be employed, the rate and extent of dealkylation depending to a large extent upon the temperature employed above that temperature at which conversion begins. With alkylated pyridines having ethyl and higher alkyl groups, reactions other than simple exchange of alkyl groups with hydrogen from the aromatics evidently occur. Evidence indicates that a splitting reaction may be involved with the formation of free unsaturated compounds such as ethylene in the dealkylation of ethyl pyridine. Some of the unsaturated compounds may then react with the available aromatic acceptors. With higher alkyl groups, such as amyl and higher radicals, cracking of the reacting group may also occur under the conditions of dealkylation to yield various products. Thus, for instance, in dealkylating amyl pyridines with benzene, other products, such as ethyl pyridine and propene from cracking of the amyl radical and propyl benzene from the subsequent alkylation of benzene with the propene, are formed as well as amyl benzene and pyridine. Di-, tri-, etc., alkyl-substituted pyridines may be only partially dealkylated to form lower molecular weight pyridines of fewer alkyl constituents and the reacting aromatics may form mono-, di-, tri-, etc., alkyl-substituted compounds as described above.

Pressures may range from atmospheric to about 10 or 12 atmospheres with superatmospheric pressures usually preferred. The pressure in the conversion zone and particularly, the partial pressure of the pyridine compound being dealkylated affects materially the extent of the dealkylation which may occur.

In a specific example of the invention, a mixture of isomers of ethyl pyridine together with an excess of benzene may be preheated to about 1100° F. and passed over fuller's earth at a temperature of from 1000 to 1200° F. and under a pressure of about ten atmospheres. The effluent vapors are quickly cooled by quenching with benzene in a conventional heat exchange condenser and the components separated by fractional distillation. Unchanged benzene and ethyl pyridines are recycled to the process, and pyridine and ethyl benzene are recovered as the principal products of the reaction.

The invention may also be applied to alkylated pyridines other than ethyl pyridines. With the methyl pyridines, for example, the products may be pyridine, lutidine, toluene and/or xylene. Likewise, complex mixtures of alkyl pyridines may be employed as sources for the preparation of pyridine, without regard to the particular alkyl benzenes formed. Furthermore, with slight modifications of reaction conditions and with careful control of the fractionation, fractions rich in various and less highly substituted alkyl pyridines of specific compositions may be recovered from the process.

Although the invention has been described in connection with the addition of benzene to the reaction, other aromatic compounds which are reactive and will form alkyl-substituted products which are thermally stable under the conditions of the experiment may be used instead of benzene. Partially alkylated benzene and naphthalenes or alkylated naphthalenes have been tried and found moderately successful. However, better yields of dealkylated pyridines have been obtained using benzene. The greater thermal stability of alkylated benzenes probably accounts for the improved yield.

Various modifications of the invention will be apparent from the discussion and drawing and may be made in the process without departing from the spirit of the invention. The example is illustrative only and is not intended to limit the scope of the invention.

I claim:

1. A process for the dealkylation of alkyl pyridines which comprises treating alkylated pyridine compounds with a reactive aromatic compound in the presence of a dealkylation catalyst and at a temperature between 850° and 1200° F.

2. A process for the dealkylation of alkyl pyridines which comprises treating alkylated pyridine compounds with benzene between about 850 and 1200° F. in the presence of a dealkylation catalyst.

3. A process for the dealkylation of alkyl pyridines which comprises treating alkylated pyridine compounds with benzene between about 850 and 1200° F. in the presence of a dealkylation catalyst from the group consisting of clays and silica-alumina.

4. A process for the dealkylation of alkyl pyridines and production of alkyl benzene which comprises heating a mixture of said alkyl pyridines and excess benzene and passing said heated mixture over an activated dealkylation catalyst between about 850 and 1200° F. to produce alkylated benzene compounds and pyridine compounds of lower molecular weight.

5. A process for the dealkylation of alkyl pyridines which comprises heating a mixture of said alkyl pyridines with an excess of benzene, passing said heated mixture in contact with a dealkylating catalyst comprising fuller's earth at a temperature between about 1000 and 1200° F. and under a pressure of about 10 atmospheres, quenching said treated mixture with benzene, and separating desired pyridine and alkylated benzene compounds.

6. A process according to claim 5 in which the alkyl pyridines comprise an isomeric mixture of ethyl pyridines, and in which pyridine and ethyl benzene are separated and unreacted ethyl pyridines and benzene are recycled.

7. A process for producing relatively low molecular weight pyridine compounds from alkyl pyridine compounds of higher molecular weight which comprises heating a mixture of said higher molecular weight pyridine compounds and reactive aromatic compounds, passing said heated mixture through a chamber containing a dealkylation catalyst at a temperature between 850° and 1200° F., withdrawing the treated mixture, quenching said treated mixture with a quantity of said aromatic compound sufficient to substantially cool the mixture, and recovering desired dealkylated pyridine compounds.

8. A process for the production of pyridine from alkylated pyridine which comprises heating said alkylated pyridine and an excess of benzene at a temperature between about 1000 and 1200° F. and a pressure of about ten atmospheres in the presence of fuller's earth, and separately recovering pyridine from a resulting product.

9. A process according to claim 8 in which said alkylated pyridine is an isomeric mixture of ethyl pyridine.

PHILIP M. ARNOLD.

REFERENCES CITED

The following references are of record in the file of this patent:

UNITED STATES PATENTS

| Number | Name | Date |
| --- | --- | --- |
| 2,010,948 | Egloff | Aug. 13, 1935 |
| 2,141,611 | Malishev | Dec. 27, 1938 |
| 2,360,358 | Mattox | Oct. 17, 1944 |

OTHER REFERENCES

Sidgwick, Organic Chemistry of Nitrogen (1942), Oxford Press, p. 522.